Jan. 15, 1952  R. L. HERRING  2,582,432
MILK EXAMINING PAN
Filed Oct. 8, 1949

INVENTOR.
R. L. Herring
BY
W. S. McDowell
ATTORNEY

Patented Jan. 15, 1952

2,582,432

UNITED STATES PATENT OFFICE 2,582,432

MILK EXAMINING PAN

Raymond L. Herring, Pataskala, Ohio

Application October 8, 1949, Serial No. 120,332

3 Claims. (Cl. 88—14)

This invention relates to an improved pan or tray for use in collecting samples of cows' milk for the purpose of visually examining the milk for the detection of certain physical disorders in the animals producing the milk, particularly mastitis.

A practical daily method of controlling mastitis in a dairy herd is by the visual examination of the dairy milk obtained from each quarter of a cow by viewing the same against a black or dark background, whereby to observe at the time of milking, any abnormalities as regards color changes or the presence of clots, flakes, strings, or the like in the milk.

It is an object of the present invention to provide a tray for facilitating such visual examination of cows' milk.

Another object of the invention is to provide a tray formed to present a plurality of separate open-topped compartments, each of which being adapted to receive milk from a particular quarter or teat of a cow.

It is another object of the invention to provide a tray of this character wherein each of the compartments thereof is provided with a curved convex bottom, so that the milk can be rolled back and forth from one end of each compartment to the other, the milk during such rolling passing over a hump formed by the convexity of the bottom, thereby thinning the milk moving over the hump so that its characteristics may be more readily observed.

Another object of the invention is to provide a tray of this character which is formed from molded plastic materials of black or dark coloration, so that the same contrasts vividly with the color of milk undergoing testing to facilitate more accurate examination.

Still a further object of the invention is to provide an examination tray for the testing of cows' milk to determine visually the presence of mastitis contamination in the milk, and wherein the tray is provided with divisional walls so formed as to receive a removable blotter containing spaced chemically active spots of thybromol, which upon being contacted with the milk reacts to produce various colorations, whereby to produce a record of each testing operation.

For a further understanding of the structural details of my improved tray, including other objects and advantages thereof, reference is to be had to the following description and the accompanying drawing, wherein.

Figure 1:
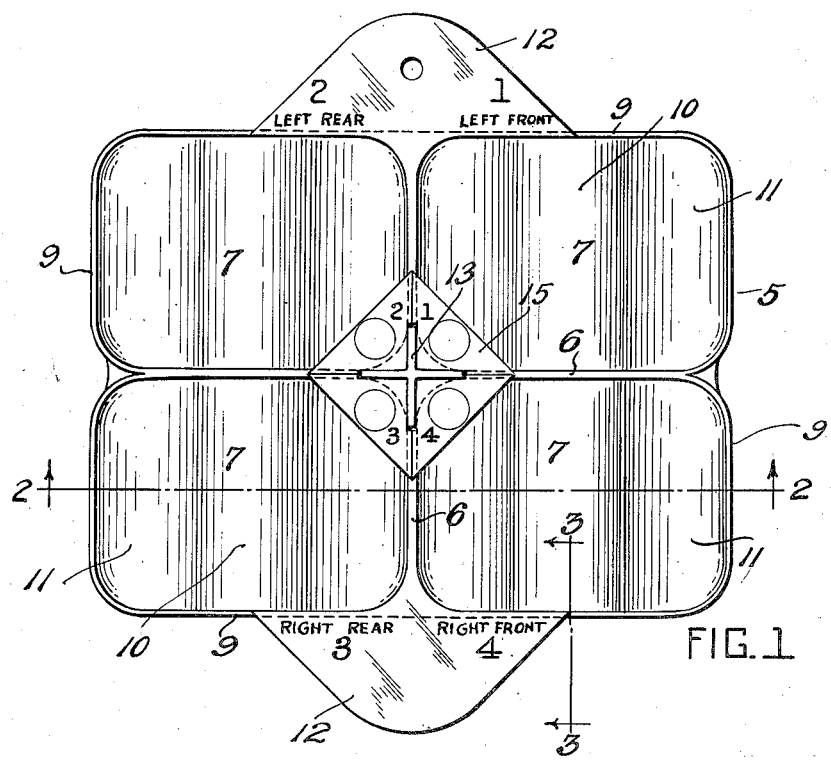
Fig. 1 is a top plan view of a milk-testing tray formed in accordance with the present invention.
Figure 2:
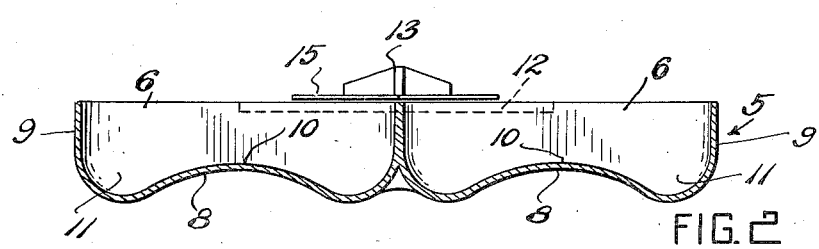
Fig. 2 is a vertical sectional view taken on the line 2—2 of Fig. 1.
Figure 3:
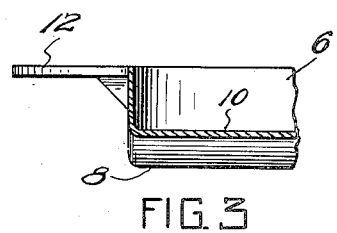
Fig. 3 is a detail transverse sectional view on the line 3—3 of Fig. 1.
Figure 4:
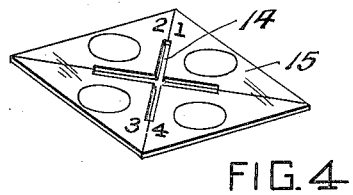
Fig. 4 is a detail perspective view of a removable record-keeping blotter adapted for use in association with my improved tray.

Referring to the drawings, my improved tray is designated in its entirety by the numeral 5. Preferably, the tray is formed from molded materials of plastic composition and black coloration. However, other equivalent materials may be employed, such as metal or wood and painted or otherwise coated to possess a dark color.

The tray is formed internally with webs 6 which provide four separate compartments 7, the latter possessing a substantially rectangular configuration when viewed in plan, as in Fig. 1. Each compartment is formed to include a bottom 8 of compound curvature, vertical upstanding side walls 9 and an open top. Each of the compartment bottoms 8 is molded or otherwise formed to include a convex hump 10 which terminates in concave pockets 11. A pair of the side walls 9 are formed with horizontally disposed gripping extensions 12, by which the tray may be held in the operator's fingers during use thereof. The upper surfaces of these extensions preferably bear suitable indicia employed to identify each of the compartments.

The webs 6 at their regions of intersection are provided with upstanding cross-shaped lugs 13 which receive similarly shaped slots 14 formed in a removable record card 15. This record card comprises the conventional thybromol testing square, the same comprising the usual neutral blotter bearing, for example, green thybromol spots which, when contacted with cows' milk, react to produce a yellowish green color when the milk is negative or free from infection, and a dark green coloration when infection is indicated. These cards also bear numbered sections which correspond with the numbers of the compartments.

In the use of the tray, each of the compartments 7 receives cows' milk from one of the four quarters of a cow being tested. A suitable quantity of milk is deposited in each of the compartments, and the tray is then rocked back and forth so that the milk passes over the convex humps 10. As the milk is rolled back and forth from one end of a compartment to the other over the hump, its coloration may be readily observed, and any abnormalities present in the milk may be virtually instantly detected by a reasonably skilled operator.

I claim:

1. A milk-examining pan comprising: an integral body composed of a bottom, upstanding outer marginal walls and internally upstanding intersecting divisional ribs, said ribs being joined with said bottom and marginal walls to provide in the pan body a plurality of relatively shallow open-topped milk-receiving compartments, a major portion of the bottom wall of each of said compartments possessing a convex configuration, with the highest plane thereof disposed substantially below the horizontal plane defining the upper edges of said marginal walls and divisional ribs, the convex portion of each of said bottom walls extending uniformly across the full width of each of said compartments from an outer marginal wall to an inner divisional rib, and the said convex portion of each compartment terminating at the ends thereof in smoothly merged concave continuations joining integrally with one of said outer marginal walls and with one of said ribs, and forming on each side of said convex portion relatively deep wells for the reception of a testing quantity of milk.

2. A milk-examining pan as defined in claim 1, and wherein said ribs at their region of intersection with one another are formed with holding means to receive an associated removable record-keeping card.

3. A milk-examining pan as defined in claim 1, and wherein a pair of said outer marginal walls are formed with laterally and outwardly directed handle extensions adapted to be gripped by the hands of an operator in the manipulation of the pan.

RAYMOND L. HERRING.

REFERENCES CITED

The following references are of record in the file of this patent:

UNITED STATES PATENTS

| Number | Name | Date |
|---|---|---|
| 1,102,156 | Lorenz et al. | June 30, 1914 |
| 1,979,664 | Birkenhauer | Nov. 6, 1934 |
| 2,460,101 | McMurray | Jan. 25, 1945 |
| 2,467,949 | Thomas | Apr. 19, 1949 |

FOREIGN PATENTS

| Number | Country | Date |
|---|---|---|
| 20,886 | Great Britain | of 1892 |
| 18,684 | Australia | July 31, 1934 |
| 519,227 | Great Britain | Mar. 20, 1940 |